(12) United States Patent
Aakvik

(10) Patent No.: US 9,325,459 B2
(45) Date of Patent: Apr. 26, 2016

(54) RADIO FREQUENCY COMMUNICATION

(71) Applicant: NORDIC SEMICONDUCTOR ASA, Trondheim (NO)

(72) Inventor: Oyvind Aakvik, Trondheim (NO)

(73) Assignee: NORDIC SEMICONDUCTOR ASA, Trondheim (NO)

( * ) Notice: Subject to any disclaimer, the term of this patent is extended or adjusted under 35 U.S.C. 154(b) by 0 days.

(21) Appl. No.: 14/563,881

(22) Filed: Dec. 8, 2014

(65) Prior Publication Data

US 2015/0163023 A1    Jun. 11, 2015

(30) Foreign Application Priority Data

Dec. 9, 2013  (GB) .................................. 1321663.5

(51) Int. Cl.
*H04B 3/46* (2015.01)
*H04L 1/20* (2006.01)
*H04L 1/24* (2006.01)

(52) U.S. Cl.
CPC . *H04L 1/203* (2013.01); *H04L 1/24* (2013.01)

(58) Field of Classification Search
None
See application file for complete search history.

(56) References Cited

U.S. PATENT DOCUMENTS 7,505,766 B2 *  3/2009  Qi et al. ........................ 455/425

* cited by examiner

*Primary Examiner* — Adolf Dsouza
(74) *Attorney, Agent, or Firm* — Koppel, Patrick, Heybl & Philpott

(57) ABSTRACT

A method of characterizing a radio frequency traffic channel comprising a transmitter and a receiver. The method comprises calculating a first error rate associated with a sequence of bits sent by the transmitter at a first amplitude and received by the receiver. The first error rate is then used to determine a second amplitude to be used by the transmitter when sending a further sequence of bits. Subsequently, a second error rate associated with this further sequence of bits is calculated and compared to a target error rate. If this second error rate differs from the target error rate by more than a predetermined amount, a third amplitude is calculated which differs from the first amplitude by a lesser amount than the second amplitude differed from the first amplitude. Otherwise, the third amplitude is calculated which differs from the second amplitude by an amount determined by the second error rate.

51 Claims, 2 Drawing Sheets

RADIO FREQUENCY COMMUNICATION

This invention relates to methods and apparatus for the calibration of devices for radio frequency (RF) communication.

RF technology is frequently used in low power, short range communications, particularly in portable devices and typically this functionality is provided by an integrated circuit device. A single device may support a large number of traffic channels, which are over-the-air links between a transmitter in one device and a receiver in another at a given frequency, coding etc. In order to understand the operation of these traffic channels, it is necessary to characterise their behaviour, and this can be done using suitable calibration.

A key feature of a traffic channel is the relationship between the error rate, for example the bit error rate (BER) on the channel, and the amount of noise the channel is subjected to. Increased noise in a channel causes the BER to increase, leading to reduced quality of transmissions. There is a direct correlation between noise level and error rate. To overcome the effect of noise partially, the transmission power may be increased in order to reduce the relative noise level. There is therefore an inverse BER-to-power-level relationship for a set noise level. However, many applications of this technology are battery powered, so minimising power output is a key factor. There is therefore an incompatible need to minimise both power output and BER and thus a balance must be found. For a given traffic channel there will be a characteristic transmission power necessary to achieve a maximum acceptable BER.

In order to find this characteristic transmission power, a device with an RF receiver can be calibrated in a test loop which transmits a known sequence of bits and uses the receiver to measure which bits are received accurately. During the test, the transmission power is varied in order to achieve the optimum BER, as defined for that particular device. The transmission power necessary to achieve it can then be recorded.

One method that has previously been used in determining these transmission power values is a binary search, in which a sequence of possible power values is used in which the difference between successive values is repeatedly halved in order to reach the target BER value. However, this method is inefficient and struggles to cope with changing noise levels, leading to inaccuracies in the results found.

A further proposal can be found in U.S. Pat. No. 7,505,766, which involves taking measurements of a reference channel on a device and using these in predictions of the required power level for all other channels. However, this does not account for differing noise levels between channels, for example when one channel is much more affected by internal environmental noise.

When viewed from a first aspect, the present invention provides a method of characterising a radio frequency traffic channel comprising a transmitter and a receiver, the method comprising:
  (a) sending a sequence of bits from the transmitter to the receiver at a first amplitude;
  (b) measuring which of said bits are accurately received by the receiver;
  (c) calculating an error rate of the channel based on the bits received;
  (d) using the calculated error rate to calculate a second amplitude which differs from the first amplitude by a first difference;
  (e) sending a further sequence of bits from the transmitter at said second amplitude and measuring which are accurately received in order to calculate a new error rate;
  (f) comparing the new error rate to a target error rate in order to determine whether the new error rate differs from the target error rate by more than a predetermined amount; and
  (g) if the new error rate differs from the target error rate by more than the predetermined amount, calculating a third amplitude, which differs from the first amplitude by a second difference which is smaller than the first difference; or
  (h) if the new error rate differs from the target error rate by less than the predetermined amount, calculating a third amplitude which differs from the second amplitude by a second difference which is calculated using the new error rate.

When viewed from a second aspect, this invention provides an apparatus for characterising a radio frequency traffic channel comprising a transmitter and a receiver, the apparatus being arranged to:
  (a) send a sequence of bits from the transmitter to the receiver at a first amplitude;
  (b) measure which of said bits are accurately received by the receiver;
  (c) calculate an error rate of the channel based on the bits received;
  (d) use the calculated error rate to calculate a second amplitude which differs from the first amplitude by a first difference;
  (e) send a further sequence of bits from the transmitter at said second amplitude and measure which are accurately received in order to calculate a new error rate;
  (f) compare the new error rate to a target error rate in order to determine whether the new error rate differs from the target error rate by more than a predetermined amount; and
  (g) if the new error rate differs from the target error rate by more than the predetermined amount, calculate a third amplitude, which differs from the first amplitude by a second difference which is smaller than the first difference; or
  (h) if the new error rate differs from the target error rate by less than the predetermined amount, calculate a third amplitude which differs from the second amplitude by a second difference which is calculated using the new error rate.

Thus it will be seen by those skilled in the art that in accordance with the invention an amplitude change is calculated on the basis of a calculated error rate, but if the amplitude change takes the error rate outside an acceptable boundary (which may be referred to as a 'bad move'), then a smaller change is applied instead. In practice, the error rate is compared to a target error rate in order to check that it is within a predetermined accuracy. If it is not found to be so, preferably the method comprises repeating steps (e) to (h) using the amplitude and difference values from the most recent iteration until the new error rate is within a predetermined accuracy of the target error rate. For example, the second amplitude is used as the first amplitude, the third amplitude is used as the second amplitude, and the second difference is used as the first difference, allowing new values for the third amplitude and the second difference to be calculated. This approach has been found in practice to give a rapid convergence to a value for the amplitude required to give the target error rate to within a reasonably accuracy.

Once a target error rate has been reached, the amplitude at which this error rate was achieved may be added to a spreadsheet of data, before the system is used to test the next traffic channel. The results from a number of traffic channels in a device can be combined and used to form a report, for example a prototype test report or a device datasheet.

Different channels operate at different frequencies and therefore are affected to a varying extent by internal frequencies, for example from crystals and DCDC converters, which are a class of power converter for converting a source of direct current from one voltage level to another. Since in accordance with embodiments of the invention the process can be carried out for each traffic channel separately, it can take account of the noise of each individual channel rather than assuming that they all operate under identical conditions. The first amplitude could be selected using previously recorded data such as theoretical data from a lookup table. Which could include different values for different channel frequencies. In a set of embodiments however the first amplitude for a subsequent channel is set to be the third amplitude for the previous channel. Where channels have similar performance, this has been found to be beneficial in giving the algorithm a goos tartign poitn and thus leading to less time being required to settle on an optimum amplitude.

In a set of embodiments, noise levels are assumed to be constant for each channel such that each channel only needs to be tested once in order characterise the device. Alternatively, if the noise in a traffic channel is suspected to be variable a confidence level may be established, in which the reliability of a result is tested by gathering statistics on the percentage of packets correctly received in order to determine whether the number sent needs to be altered, as confidence level is highly dependent on the number of packets sent. This enables the effect of random noise to be minimised by increasing the number of packets sent in order to calculate the error rate.

In a set of embodiments, a 'bad move' is triggered if the first and second error rates are equal, but a different calculation is used for the third amplitude. This is advantageous where, as may be the case, calculating the second difference (which is added to the second amplitude to find the third amplitude) involves calculating a gain factor based on a division by a difference between the first and second error rates. If the first and second error rates are equal, the calculation of the second difference will therefore involve a division by zero. This may happen when the starting point or initial amplitude for a system is unknown.

The different calculation may comprise calculating said gain factor by multiplying a previous gain factor by a predetermined value rather than based on a division by the (zero) difference between the error rates. This ensures that the error rate values move away from these boundaries. Once this has happened both the 'bad move' and gain calculations can be carried out as explained above, as the error rates and amplitudes will be able to converge on final values.

As mentioned above a traffic channel comprises a transmitter and a receiver. A typical integrated circuit device will comprise at least one of each to permit two-way communication with other devices. The method and apparatus of the invention may be used to calibrate the transmitter and/or to characterise the receiver of such a device. For the latter purpose a test apparatus may be provided which is arranged to cooperate with a device comprising an RF receiver and which comprises an adjustable transmitter.

Such an apparatus is novel and inventive and thus when viewed from a third aspect, the invention provides an apparatus arranged to communicate with a device comprising a radio frequency receiver, the apparatus comprising a transmitter and being arranged to:

(a) send a sequence of bits from the transmitter to the receiver at a first amplitude;
(b) measure which of said bits are accurately received by the receiver;
(c) calculate an error rate of the channel based on the bits received;
(d) use the calculated error rate to calculate a second amplitude which differs from the first amplitude by a first difference;
(e) send a further sequence of bits from the transmitter at said second amplitude and measure which are accurately received in order to calculate a new error rate;
(f) compare the new error rate to a target error rate in order to determine whether the new error rate differs from the target error rate by more than a predetermined amount; and
(g) if the new error rate differs from the target error rate by more than the predetermined amount, calculate a third amplitude, which differs from the first amplitude by a second difference which is smaller than the first difference; or
(h) if the new error rate differs from the target error rate by less than the predetermined amount, calculate a third amplitude which differs from the second amplitude by a second difference which is calculated using the new error rate.

In accordance with all aspects of the invention the apparatus could be arranged to determine indirectly from the receiver which bits have been correctly received through the receipt of acknowledgements sent over the air (e.g. by a transmitter included as part of a device under test). These may be sent for each individual packet, or the number of packets received may be counted and acknowledged at the end of a burst of packets. In a preferred set of embodiments however there is a further, e.g. wired, communication path between the receiver and the test apparatus or other part of the apparatus which allows confirmation of bits or packets received to be communicated back to the processor executing the method.

In a set of embodiments, the error rate calculated in accordance with all aspects of the invention is a packet error rate, but alternatively it may be a bit error rate.

Adjustments to the amplitude of the signal based on the calculated error rate may be made using any suitable mathematical function. This function may be an error function, for example a Gaussian error function.

In a set of embodiments if the new error rate differs from the target error rate by more than the predetermined amount, the third amplitude is calculated using a new value of a gain applied to the function used to calculate the difference based on the measured error rate.

Each iteration of the method generates a new error rate, which is tested against the target error rate. This target rate may be set according to the device being tested. For example, a value between 0 and 0.5, e.g. between 0.2 and 0.35 could be chosen. The precise value may be chosen according to circumstances. In a specific exemplary embodiment, the target packet error rate may be 0.308.

The predetermined amount by which the new error may differ from the target error rate before a 'bad move' indication is triggered may be within 50% of the target error rate value, preferably within 30% e.g. within 25%. The value of the error rate which triggers the 'bad move' indication must fulfil the following condition:

$$\text{IF } TargetErrorRate > 0.50 \; BadMoveTrigger \ll \frac{1}{TargetErrorRate} - 1$$

$$\text{Else } BadMoveTrigger \ll \frac{1}{1 - TargetErrorRate} - 1$$

This condition ensures that the BadMoveTrigger is less than or equal to 1, but the exact value of the BadMoveTrigger may be chosen according to the circumstances of the receiver, in order to fulfil any necessary conditions.

An embodiment of the invention will now be described, by way of example only, with reference to the accompanying drawings in which.

Figure 1:
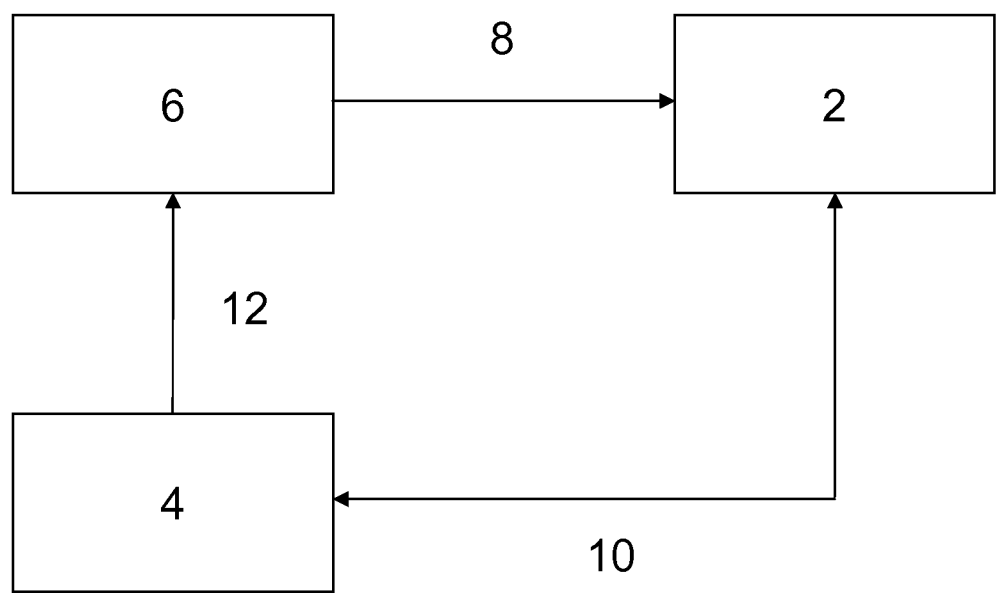
FIG. 1 shows a block diagram of an embodiment of the invention.

FIG. 1 shows a block diagram of an embodiment of the invention for characterising a device under test (DUT) 2 which incorporates a radio frequency receiver. The test apparatus 4 comprises a transmitter 6 and is thus able to communicate with the device under test 2 using RF signals 8. A further communication path 10 exists between the DUT 2 and the test apparatus 4 using a Serial Peripheral Interface, Universal Asynchronous Receiver/Transmitter and Single Wire Interface (SPI/UART/SWI). This enables the test apparatus 4 both to send test packets to the DUT 2, and to measure how many of these packets are correctly received by the device.

The test apparatus 4 has a communication interface 12 with the transmitter 6 comprising Peripheral Component Interconnect Extensions for Instrumentation, General Purpose Interface Bus, Transmission Control Protocol/Internet Protocol, Universal Serial Bus or Universal Asynchronous Receiver/Transmitter (PXI/GPIB/TCPIP/USB/UART). It uses the interface 12 to control the amplitude of transmissions.

Figure 2:
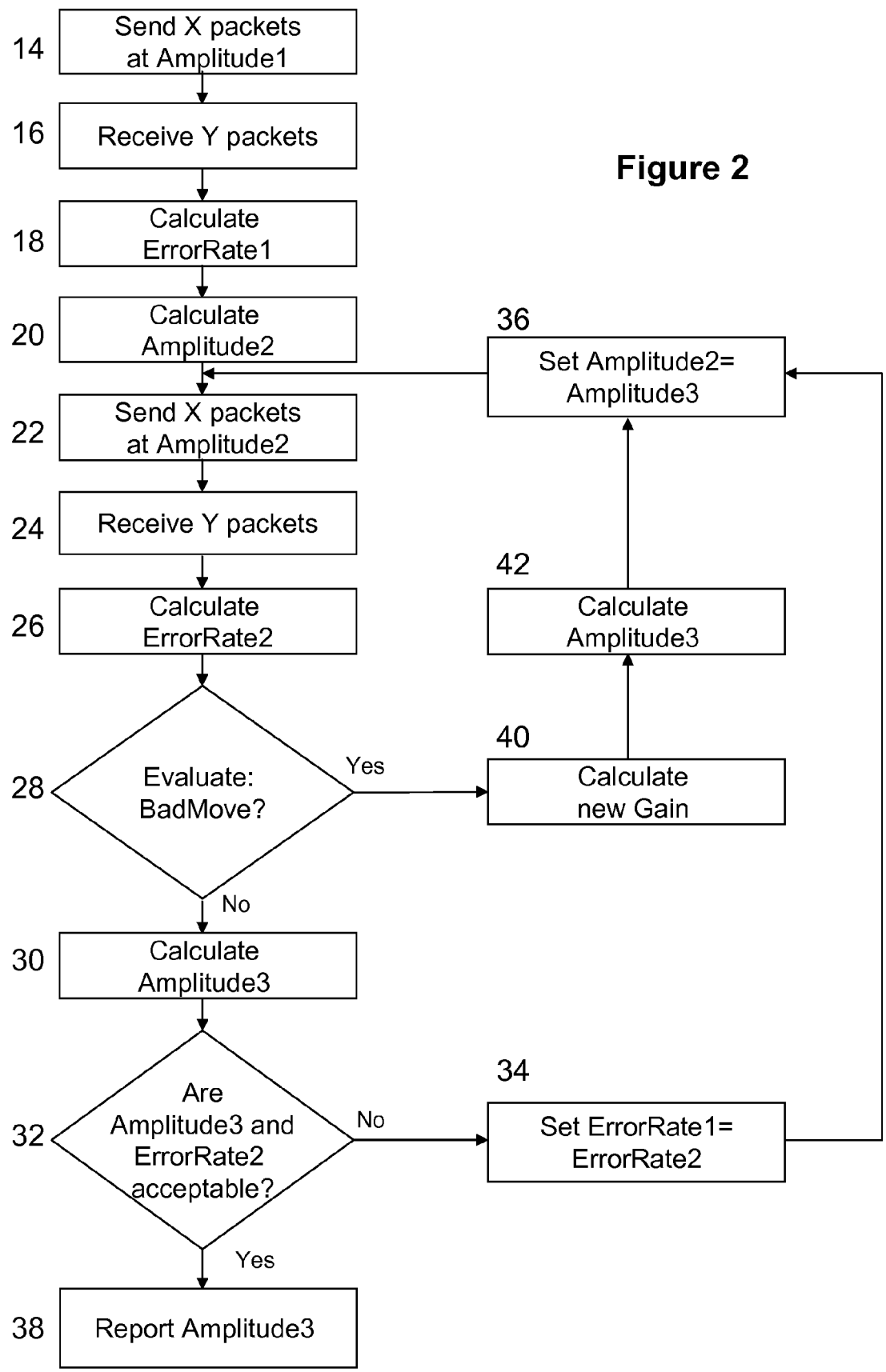
FIG. 2 shows a flow chart demonstrating operation of the method.

FIG. 2 is a flow chart illustrating operation of the embodiment. The apparatus 4 is initialised at Amplitude1, which is a predetermined starting value, with a target packet error rate, TargetErrorRate for the DUT 2 having been set. A number of packets (X) are then sent (in step 14) from the transmitter 6 at said Amplitude1 to the receiver in the DUT 2, and the test apparatus 4 measures the number of packets that are received (Y) in step 16, using the direct connection 10 to the DUT 2. The actual packet error rate, ErrorRate1 is then calculated in step 18, for example as ErrorRate1=(X−Y)/Y. A second transmission amplitude is used for transmitting the next sequence of packets. Amplitude2 is calculated in step 20 based on ErrorRate1, for example using the equations:

$$Difference1 = \tag{1}$$
$$Gain * erf^{-1}\left(\frac{ErrorRate1 - 0.5}{0.501}\right) - erf^{-1}\left(\frac{TargetErrorRate - 0.5}{0.501}\right)$$

$$Amplitude2 = Amplitude1 + Difference1 \tag{2}$$

Equation (1) uses a Gaussian error function although this is not essential, and in fact other types of function could be used to calculate the new amplitude based upon the current and target error rates. The error function is multiplied by a Gain factor to determine the change in amplitude which will be applied.

Amplitude2 is then applied to the transmitter 6 to send a further X packets in step 22. The number correctly received is measured as Y in step 24. This allows a new packet error rate, ErrorRate2 to be calculated (step 26) in the same manner as ErrorRate1. Once ErrorRate2 has been calculated, a threshold test (step 28) is conducted to determine whether the new error rate is within an acceptable boundary from the target value. This is done using a BadMove calculation, where a BadMove is declared if the new error rate is more than a certain amount from the target value, in this case 25%. Thus:

BadMove if |ErrorRate1|−
　TargetErrorRate|*1.25<|ErrorRate1−ErrorRate2| (3)

with ErrorRate1 and ErrorRate2 being the first and second measured error rates respectively, and TargetErrorRate being the desired error rate for the system. If ErrorRate2 was not found to be a BadMove, Amplitude3 is calculated at step 30.

If it is found to have been a BadMove, then a new Gain factor is calculated (step 40), based upon the error rates for the system, using:

$$Gain = Gain * \left|\frac{ErrorRate1 - TargetErrorRate}{ErrorRate1 - ErrorRate2}\right|, \tag{4}$$

which is then inputted into (step 42):

$$Difference2 = \tag{5}$$
$$Gain * \left[erf^{-1}\left(\frac{ErrorRate2 - 0.5}{0.501}\right) - erf^{-1}\left(\frac{TargetErrorRate - 0.5}{0.501}\right)\right]$$

and therefore Amplitude3=Amplitude1+Difference2 (6).

However, if ErrorRate2 is not found to be a BadMove, then the Gain factor is not changed, and Amplitude3 is simply calculated using equivalents of equations (1) and (2).

For example, if Amplitude1=3, Gain=1, ErrorRate1=0, and TargetErrorRate=0.308, the calculation gives Difference1=−1.832, and Amplitude2=1.168. Assuming this then gives ErrorRate2=1, it can be seen that 0.385<1, and therefore this was a BadMove. It is then necessary to recalculate the Gain factor, which gives a value of 0.308 (using Equation (4)). This can then be used to calculate Amplitude 3, giving Difference2=−0.564 and Amplitude3=2.436.

Once Amplitude3 has been calculated (step 30), it is necessary to check whether this move has brought the error rate to within an expected accuracy of the target value. This can be done in a number of ways, and is preferably done using checks on both ErrorRate2 and Amplitude3 in step 32. Amplitude3 is checked to ensure that it has not changed dramatically, as this would imply that there was an inconsistency in the system. This is done using Amplitude3−Amplitude2≤SetAccuracy (7), where SetAccuracy is a value that can be chosen according to system parameters, for example at 0.1 dB. ErrorRate2 can then be checked to be within a certain range for TargetErrorRate, for example ErrorRate2=TargetErrorRate±0.05 (8). If the system has reached a suitable level of accuracy for the error rate, the cycle is ended and the value of Amplitude3 is recorded. However, if the error rate is not within a suitable level of accuracy, the above process is repeated, with ErrorRate1 taking the current value of ErrorRate2 (step 34) and Amplitude2 taking the value of Amplitude3 (step 36) and new values of these parameters being calculated. This is repeated until they are suitably accurate, at which point the final value of Amplitude3 is outputted in step 38.

Once a final value of Amplitude3 has been reached for a particular traffic channel (step 38) it is recorded, for example in a database which will form an information sheet to accompany a new product. The process then begins again with the next channel, and each of the traffic channels is tested until the entire device has been adjusted such that the error rates are optimal and the amplitudes at which these occur have all been recorded. In cases where channels are similar in performance it is proven beneficial to use this result as starting point for the next iteration of the process (Amplitude1=Amplitude3). Alternatively, previously recorded data or theoretical data presented in a LUT e.g. with amplitudes versus channel frequency can be used as input in the initial step of setting Amplitude1, thus giving the algorithm a good starting point, leading to less time spent searching for the optimal amplitude.

Alternatively, a second condition may be imposed on a BadMove, with the method of recalculation changing dependent on this condition. It will be a BadMove if:

ErrorRate1=ErrorRate2 OR

|ErrorRate1−TargetErrorRate|*1.25<|ErrorRate1−ErrorRate2|

The second of these is the condition discussed above, but the first is the new criterion which must be tested first to avoid the risk of division by zero. Thus:

$$\text{If} \quad \begin{aligned} & ErrorRate1 = ErrorRate2 \\ & Gain = Gain * GainIncreaseConstant \end{aligned}$$

$$\text{Else} \quad Gain = Gain * \left| \frac{ErrorRate1 - TargetErrorRate}{ErrorRate1 - ErrorRate2} \right|$$

GainIncreaseConstant is a predetermined value which can be determined experimentally depending on the equipment in use. It may be in the range of 0 to 10, for example 1.5. Once the error rates have been recalculated and are no longer equal, the gain can be calculated as previously, i.e. according to the second equation as seen above.

The invention claimed is:

1. A method of characterising a radio frequency traffic channel comprising a transmitter and a receiver, the method comprising:
   (a) sending a sequence of bits from the transmitter to the receiver at a first amplitude;
   (b) measuring which of said bits are accurately received by the receiver;
   (c) calculating an error rate of the radio frequency traffic channel based on the bits received;
   (d) using the calculated error rate to calculate a second amplitude which differs from the first amplitude by a first difference;
   (e) sending a further sequence of bits from the transmitter at said second amplitude and measuring which are accurately received in order to calculate a new error rate;
   (f) comparing the new error rate to a target error rate in order to determine whether the new error rate differs from the target error rate by more than a predetermined amount; and
   (g) if the new error rate differs from the target error rate by more than the predetermined amount, calculating a third amplitude, which differs from the first amplitude by a second difference which is smaller than the first difference; or
   (h) if the new error rate differs from the target error rate by less than the predetermined amount, calculating a third amplitude which differs from the second amplitude by a second difference which is calculated using the new error rate.

2. The method as claimed in claim 1, wherein the method is carried out for each traffic channel in a system separately.

3. The method as claimed in 2 comprising using the third amplitude from a first channel as the first amplitude for a subsequent channel.

4. The method as claimed in claim 2, wherein a noise level is assumed to be constant for each channel.

5. The method as claimed in claim 1, comprising gathering statistics on the percentage of bits accurately received if the noise level is assumed to be variable.

6. The method as claimed in claim 1, comprising calculating the third amplitude using a different calculation if the calculated error rate and new error rate are equal.

7. The method as claimed in claim 1, comprising using said method to calibrate the transmitter and/or characterise the receiver of the traffic channel.

8. The method as claimed in claim 1, comprising determining indirectly from the receiver which bits have been correctly received through receipt of acknowledgements sent over the air.

9. The method as claimed in claim 8, wherein the acknowledgements are sent for each individual packet.

10. The method as claimed in claim 8, wherein the acknowledgements are sent at the end of a burst of packets.

11. The method as claimed in claim 1, comprising communicating confirmation of bits or packets received via a further communication path, e.g. a wired communication path.

12. The method as claimed in claim 1, wherein the error rate calculated is a packet error rate.

13. The method as claimed in claim 1, comprising calculating the second and third amplitudes using a mathematical function.

14. The method as claimed in claim 13, wherein the mathematical function is an error function.

15. The method as claimed in claim 13, wherein the mathematical function is a Gaussian error function.

16. The method as claimed in claim 13, wherein if the new error rate differs from the target error rate by more than a predetermined amount, the third amplitude is calculated using a new value of a gain applied to the function used to calculate the difference based on the measured error rate.

17. The method as claimed in claim 16, comprising calculating the new value of the gain by multiplying a previous gain factor by a predetermined value if the calculated error rate and new error rate are equal.

18. An apparatus for characterising a radio frequency traffic channel comprising a transmitter and a receiver, the apparatus being arranged to:
   (a) send a sequence of bits from the transmitter to the receiver at a first amplitude;
   (b) measure which of said bits are accurately received by the receiver;
   (c) calculate an error rate of the radio frequency traffic channel based on the bits received;
   (d) use the calculated error rate to calculate a second amplitude which differs from the first amplitude by a first difference;
   (e) send a further sequence of bits from the transmitter at said second amplitude and measure which are accurately received in order to calculate a new error rate;
   (f) compare the new error rate to a target error rate in order to determine whether the new error rate differs from the target error rate by more than a predetermined amount; and
   (g) if the new error rate differs from the target error rate by more than the predetermined amount, calculate a third amplitude, which differs from the first amplitude by a second difference which is smaller than the first difference; or (h) if the new error rate differs from the target error rate by less than the predetermined amount, calculate a third amplitude which differs from the second amplitude by a second difference which is calculated using the new error rate.

19. The apparatus as claimed in claim 18, wherein the apparatus is arranged to carry out steps (a) to (h) for each traffic channel in a system separately.

20. The apparatus as claimed in claim 19 arranged to using the third amplitude from a first channel as the first amplitude for a subsequent channel.

21. The apparatus as claimed in claim 18, wherein a noise level is assumed to be constant for each channel.

22. The apparatus as claimed in claim 18, arranged to gather statistics on the percentage of bits accurately received if the noise level is assumed to be variable.

23. The apparatus as claimed in claim 18, arranged to calculate the third amplitude using a different calculation if the calculated error rate and new error rate are equal.

24. The apparatus as claimed in claim 18 arranged to use said method to calibrate the transmitter and/or characterise the receiver of the traffic channel.

25. The apparatus as claimed in claim 18, arranged to determine indirectly from the receiver which bits have been correctly received through the receipt of acknowledgements sent over the air.

26. The apparatus as claimed in claim 25, wherein the acknowledgements are sent for each individual packet.

27. The apparatus as claimed in claim 25, arranged to send the acknowledgements at the end of a burst of packets.

28. The apparatus as claimed in claim 18, arranged to communicate confirmation of bits or packets received via a further communication path.

29. The apparatus as claimed in claim 18, wherein the error rate calculated is a packet error rate.

30. The apparatus as claimed in claim 18, arranged to calculate the second and third amplitudes using a mathematical function.

31. The apparatus as claimed in claim 30, wherein the mathematical function is an error function.

32. The apparatus as claimed in claim 30, wherein the mathematical function is a Gaussian error function.

33. The apparatus as claimed in claim 30, arranged such that if the new error rate differs from the target error rate by more than a predetermined amount, the third amplitude is calculated using a new value of a gain applied to the function used to calculate the difference based on the measured error rate.

34. The method as claimed in claim 33, arranged to calculate the new value of the gain by multiplying a previous gain factor by a predetermined value if the calculated error rate and new error rate are equal.

35. An apparatus arranged to communicate with a device comprising a radio frequency receiver, the apparatus comprising a transmitter and being arranged to:

(a) send a sequence of bits from the transmitter to the receiver at a first amplitude;

(b) measure which of said bits are accurately received by the receiver;

(c) calculate an error rate of the channel based on the bits received;

(d) use the calculated error rate to calculate a second amplitude which differs from the first amplitude by a first difference;

(e) send a further sequence of bits from the transmitter at said second amplitude and measure which are accurately received in order to calculate a new error rate;

(f) compare the new error rate to a target error rate in order to determine whether the new error rate differs from the target error rate by more than a predetermined amount; and (g) if the new error rate differs from the target error rate by more than the predetermined amount, calculate a third amplitude, which differs from the first amplitude by a second difference which is smaller than the first difference; or (h) if the new error rate differs from the target error rate by less than the predetermined amount, calculate a third amplitude which differs from the second amplitude by a second difference which is calculated using the new error rate.

36. The apparatus as claimed in claim 35, wherein the apparatus is arranged to carry out steps (a) to (h) for each traffic channel in a system separately.

37. The apparatus as claimed in claim 36 arranged to using the third amplitude from a first channel as the first amplitude for a subsequent channel.

38. The apparatus as claimed in claim 35, wherein a noise level is assumed to be constant for each channel.

39. The apparatus as claimed in claim 35, arranged to gather statistics on the percentage of bits accurately received if the noise level is assumed to be variable.

40. The apparatus as claimed in claim 35, arranged to calculate the third amplitude using a different calculation if the calculated error rate and new error rate are equal.

41. The apparatus as claimed in claim 35 arranged to use said method to calibrate the transmitter and/or characterise the receiver of the traffic channel.

42. The apparatus as claimed in claim 35, arranged to determine indirectly from the receiver which bits have been correctly received through the receipt of acknowledgements sent over the air.

43. The apparatus as claimed in claim 36, wherein the acknowledgements are sent for each individual packet.

44. The apparatus as claimed in claim 36, arranged to send the acknowledgements at the end of a burst of packets.

45. The apparatus as claimed in claim 36, arranged to communicate the confirmation of bits or packets received via a further communication path.

46. The apparatus as claimed in claim 35, wherein the error rate calculated is a packet error rate.

47. The apparatus as claimed in claim 35, arranged to calculate the second and third amplitudes using a mathematical function.

48. The apparatus as claimed in claim 35, wherein the mathematical function is an error function.

49. The apparatus as claimed in claim 48, wherein the mathematical function is a Gaussian error function.

50. The apparatus as claimed in claim 49, arranged such that if the new error rate differs from the target error rate by more than a predetermined amount, the third amplitude is calculated using a new value of a gain applied to the function used to calculate the difference based on the measured error rate.

51. The apparatus as claimed in claim 50, arranged to calculate the new value of the gain by multiplying a previous gain factor by a predetermined value if the calculated error rate and new error rate are equal.

* * * * *